Patented May 4, 1948

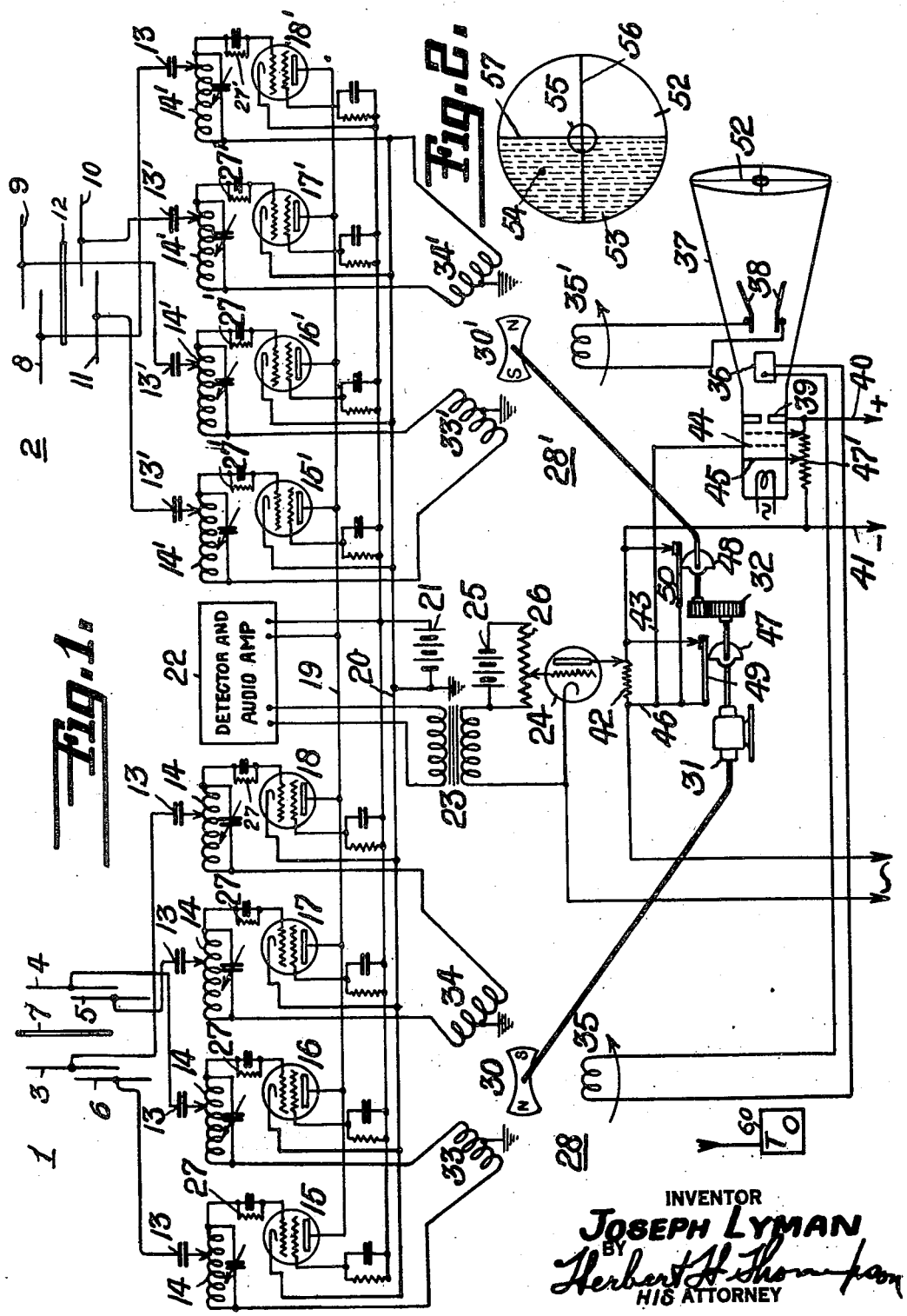

2,440,777

UNITED STATES PATENT OFFICE 2,440,777

TRIDIMENSIONAL RADIO DIRECTION INDICATOR

Joseph Lyman, Huntington, N. Y., assignor to The Sperry Corporation, a corporation of Delaware Continuation of application Serial No. 201,688, April 13, 1938. This application January 31, 1946, Serial No. 644,511

17 Claims. (Cl. 343—16)

This invention relates, generally, to the three-dimensional location of objects by radio means, and the invention has reference, more particularly, to novel improvements in the tridimensional radio direction indicator of the type disclosed in my copending application Serial No. 139,640, filed April 29, 1937, now Patent No. 2,231,929, dated February 18, 1941. The present application is a continuation of my copending application Serial No. 201,688, filed April 13, 1938, now abandoned.

In the above patent there is disclosed a tridimensional radio direction indicator employing directional antenna provided with rotating parabolic reflectors for scanning the territory to be viewed, the output of said antennae being detected, amplified and employed for tripping electronic or thermionic rectifier means, the output of which is used to control a cathode ray tube, the deflecting plates of which tube are synchronously energized with the operation of said antenna, whereby a spot is caused to appear on the screen of said cathode ray tube in a position corresponding to the position of an object, such as an airplane, in the territory being viewed.

The principal object of the present invention is to provide a novel, improved tridimensional radio direction indicator employing stationary antenna means in conjunction with electronic devices for producing, in effect, rapidly rotating lobes of maximum electromagnetic signal reception to effect scanning of the territory being viewed, the output of the antenna means being detected, amplified and then employed for tripping electronic means connected for controlling a cathode ray tube, the deflecting plates of which are synchronously energized with the rotation of the signal reception lobes, whereby a spot is caused to appear on the tube screen in a position corresponding to the position of an object from which electromagnetic waves emanate either by direct transmission or by reflection, such as an airplane, in the territory being viewed.

It is another object of the invention to detect remote objects by radiating electromagnetic energy thereto and receiving energy reflected thereby, the receiving means including directional scanning antenna means producing moving lobes of maximum signal reception in combination with indicator means actuated synchronously with movement of said lobes for indicating the orientation of the remote object.

Other objects and advantages will become apparent from the specification, taken in connection with the accompanying drawings wherein one embodiment of the invention is illustrated.

In the drawings,

Fig. 1 is a wiring diagram embodying the novel device of the present invention.

Fig. 2 is a view in front elevation of the cathode ray tube used.

In the drawings, there are shown an azimuth or horizontally scanning directional antenna array 1, consisting of four vertical antenna elements 3, 4, 5 and 6 symmetrically disposed about a reflector 7, and an elevation or vertically scanning directional antenna array 2, consisting of four horizontal antenna elements 8, 9, 10 and 11 symmetrically disposed about a reflector 12. The azimuth scanning antenna elements 3 to 6 are connected through respective condensers 13 to respective tuned circuits 14 connected to the respective control grid of radio frequency amplifier electronic tubes 15, 16, 17 and 18. The plate-cathode circuits of tubes 15 to 18 are connected through common leads 19 and 20 and plate battery 21 to a detector and audio amplifier 22, the output of which is applied through transformer 23 to the input of a grid-controlled rectifier or trigger tube 24. A C-battery 25 and potentiometer 26 are employed for adjusting the bias on the grid of tube 24, thereby to determine at will the magnitude of the output of detector-amplifier 22 necessary to effect the discharge of tube 24. Tube 24 has its plate-cathode circuit supplied preferably with a high audio frequency voltage, i. e., a voltage of preferably at least 1000 cycles per second, so that this tube shuts off immediately when the output of the detector-amplifier 22 has fallen below a predetermined value, owing to the passage of the plate potential through the zero or a low point of its cycle.

The elevation scanning antenna elements 8 to 11 are connected through respective condensers 13' to respective tuned circuits 14' connected to the respective control grids of radio frequency amplifier tubes 15', 16', 17' and 18'. The plate-cathode circuits of tubes 15' to 18' are also connected through the leads 19 and 20 and plate battery 21 to the detector-amplifier 22. The grid bias resistances 27 and 27' of the tubes 15 to 18 and 15' to 18', respectively, normally bias these tubes to a suitable point on the characteristic curve thereof. However, the grid bias on the respective tubes of each set 15 to 18 and 15' to 18' is consecutively changed in a definite sequence and the sequence is repeated indefinitely by means of suitable voltage-producing or generating means illustrated as two-phase generators 28 and 28' in the drawings, in order that the output of the respective antenna elements 3 to 6 and 8 to 11 will successively receive maximum amplification, whereby rotating lobes of maximum electromagnetic signal reception are produced moving concentrically with reflectors 7 and 12, i. e., rotating directive receptivities are obtained at antennae 1 and 2.

The permanent magnet rotor 30 of generator 28 is driven from a motor 31 and the armature 30' of generator 28' is also driven from motor 31, but through step-up gearing 32 which serves to drive armature 30' at a much faster rate than armature 30. One stator winding 33 of the generator 28 has its ends respectively connected to the grids of tubes 15 and 16 through the tunable circuits 14 thereof, whereas stator winding 34 of this generator has its ends respectively connected to the grids of tubes 17 and 18. A third stator winding 35 of the generator 28 has its terminals connected to the respective horizontal deflecting plates 36 of a cathode ray tube 37. Similarly, the stator winding 33' of generator 28' has its terminals connected to the grids of tubes 15' and 16', respectively, whereas the terminals of stator winding 34' are respectively connected to the grids of tubes 17' and 18', respectively. The stator winding 35' of generator 28' has its ends connected to the respective vertical deflecting plates 38 of the cathode ray tube 37. The windings 35 and 35' are angularly adjustable, as indicated by the arrows in the drawing, so that the phase of the outputs of these windings relative to the rotation of the receptivity lobes may be varied as desired.

The anode 39 of cathode ray tube 37 is supplied from the positive side 40 of a direct current source, while the negative side 41 of this source is connected through a resistor 42, lead 46 and lead 43 to the control grid 44 of the cathode ray tube. The cathode 45 is connected through a portion of resistance 47' to the negative side 41 of the source.

The motor 31 is shown arranged for rotating a cam 47 at the same rate of speed as that of armature 30. This motor 31 also drives a cam 48 at the same rate of speed as armature 30'. Cam 47 is adapted to operate a make and break contact member 49, whereas cam 48 is adapted to operate a make and break contact member 50. The cams 47 and 48 are so disposed angularly with respect to their respective associated armatures 30 and 30' that these cams serve to close the contactors 49 and 50 during the periods that the rotating lobes of maximum electromagnetic signal reception produced by antenna arrays 1 and 2 are passing through or scanning the rearward half or 180° of their respective arcs of motion. With either of the contact members 49 or 50 closed, the resistor 42 is short-circuited so that the cathode ray tube 37 is biased off, regardless of the action of tube 24. While the antenna arrays 1 and 2 are scanning the forward half of their fields of view, i. e., while the lobes of maximum signal reception are passing through the 180° of territory that is desired to be scanned, the contactors 49 and 50 are open due to the action of the cams 47 and 48.

The rotating lobes of maximum electromagnetic signal reception produced by antennae 1 and 2 have the effect of causing amplitude modulation of the unmodulated carrier wave received from the transmitter at the object which is being viewed, or which is reflected from such object as disclosed in my prior above-mentioned patent. Preferably, the carrier wave is of ultra-high frequency, not only because the same can be generated and received by simple means, but also because these waves easily penetrate fog, are not appreciably interfered with by unforetellable natural phenomena, such as radiation from the sun, and can be detected directionally with comparative ease. Ultra-high-frequency waves of frequencies of approximately 600 megacycles per second or higher are entirely satisfactory. An ultra-high-frequency transmitter of an unmodulated carrier may be carried by the object, such as an airplane that is desired to be located, or the transmitter 60 may be installed adjacent the apparatus of this invention though shielded therefrom, in which case waves reflected by the object to be located will excite the receiver antenna arrays 1 and 2. If desired, this transmitter may be caused to scan synchronously with the receiver, as disclosed in my prior application.

In use, as will further appear, it is necessary for the slower rotating lobe of maximum electromagnetic signal reception, i. e., the output of antenna array 1, to rotate fast enough so as to prevent flicker on the screen 52 of the cathode ray tube 37. In practice it has been found that to prevent flicker the moving lobe should rotate at a speed of 750 R. P. M. or over, and as the ratio of the speeds of the lobe produced by antenna array 1 and that produced by antenna array 2 will determine the number of scanning lines provided on the face 52 of indicator tube 37, it is essential that the lobe produced by antenna array 2 travel at a considerably faster speed than that produced by antenna 1. Experience has shown that a 30 line system having 12½ pictures per second is satisfactory in use, which means that the moving lobe of antenna array 2 must travel 30 times as fast as the rotating lobe produced by antenna array 1, or in other words, if the lobe rotation of antenna 1 rotates at 12½ R. P. S. or 750 R. P. M., then the vertical scanning antenna lobe of antenna 2 should rotate at 375 R. P. S. or 22,500 R. P. M.

As rotor 30 rotates, a pole thereof passes winding 33 and induces an E. M. F. therein, which causes the grid voltage on one of the tubes 15 or 16, depending on the sign of the passing pole, to increase to a maximum, thereby causing the tube 15, for example, to provide maximum radio amplification of the received electromagnetic energy extending in a line from reflector 7 radially through antenna element 6. As armature 30 continues to rotate, the voltage output of winding 33 falls off while that of winding 34 increases, thereby increasing the amplification of tube 17 and reducing that of tube 15 so that the lobe of received directivity is rotated from antenna element 6 to antenna element 5, and so on, angularly around the reflector 7 at a rapid rate.

The stator winding 35 of generator 28 is so set with respect to windings 33 and 34 that when the rotating lobe of antenna array 1 is at one end of its desired scanning field and advancing therein, for example, at the right end of its 180° scanning field, then the right hand horizontal deflecting plate 36 of the cathode ray tube will be receiving the maximum positive output of winding 35, while the left hand deflecting plate 36 will be connected to the negative side of this winding. As the lobe of signal reception turns forwardly, the potential on the right hand horizontal deflecting plate 36 decreases while that on the left hand deflecting plate increases, so that by the time the lobe is extending directly forward, these plates are at the same potential, and by the time the lobe has reached the end of its travel and is at the left hand side of the scanning area, the left hand horizontal deflecting plate will have the maximum voltage output of winding 35, whereas the right hand plate will have a negative voltage. Thus, if the cathode ray tube beam were on, the tube beam would travel across the face 52 of the tube in synchronism with the motion of the receiving lobe. Actually, the cathode ray beam is only on when the receiving lobes of both antennae 1 and 2 are directed at the object being scanned, i. e., when the outputs of the antenna arrays 1 and 2 are at their maximum, as will further appear.

While the imaginary cathode ray beam is travelling transversely over the tube face 52, it is also being made to scan this face vertically by the action of generator 28'. Thus, as armature 30' rotates the antennae 11, 10, 9 and 8 will be successively coupled for maximum amplification by the operation of generator 28', thereby causing the lobe of received energy to rotate about the reflector 12. As this lobe moves into its forward scanning area, say, for example, moving forwardly and upwardly from a position projecting downwardly, the winding 35' acts to correspondingly apply voltages to the vertical deflecting plates 38. With the lobe projecting downwardly, the lower plate 38 receives the maximum positive potential of winding 35', whereas the upper plate is connected to the negative terminal of this winding at this time. As the lobe moves forwardly and upwardly, the voltage on the lower plate 38 decreases while that on the upper plate increases until, as before, when the lobe has traversed 180° of forward motion, the upper plate 38 will by that time have received its maximum potential. Inasmuch as the armature 30' of generator 28' makes 30 revolutions to one revolution of armature 30, it is evident that the cathode ray beam (imagining the beam to be on) makes 30 vertical passages across the screen 52 while making one transverse passage thereacross, producing the scanning effect shown in Fig. 2, by the dotted lines 53. Actually these lines do not appear on the face of the screen 52 because the tube is biased to off position, as previously pointed out, by having its control grid connected to the negative lead 41. The output of the transformer 23 is applied to the input of a grid-controlled rectifier 24. The C-battery 25 and potentiometer 26 serve for adjusting the bias on the grid of tube 24, thereby to determine at will the magnitude of the output of the detector-amplifier necessary to effect the discharge of tube 24. The high audio frequency voltage, i. e., of at least 1000 cycles, supplied to the plate-cathode circuit of tube 24 serves to shut off this tube immediately when the output of the detector-amplifier has fallen below its maximum, i. e., below that obtaining when the receiving lobes of both antenna arrays 1 and 2 are aimed at the transmitter of the craft being viewed, or at the craft itself where the system is operating by reflected waves. The bias on tube 24 as determined by potentiometer 26 is such that the tube 24 only discharges at the time of substantially maximum voltage output of the detector-amplifier, i. e., when the lobes of signal reception of both antenna arrays 1 and 2 are simultaneously directed at the object being scanned. Thus, assuming that an object is in the relative position shown at 54 in Fig. 2, then, as the relatively slowly moving horizontal scanning lobe of reception of antenna array 1 moves through space, it will reach a position corresponding to spot 54, whereupon the output of the array 1 will be a maximum. Similarly, the relatively rapidly moving vertical scanning lobe of reception of antenna array 2 will pass through the point 54 while the slowly moving horizontal scanning lobe is still directed thereat, and hence at this instant the output of the array 2 will also be a maximum. These two maximum outputs supplied simultaneously to detector-amplifier 22 and from thence to tube 24 serve to momentarily overcome the negative bias on tube 24 so that it passes current. The discharge of tube 24 produces a voltage drop across the resistor 42 in the plate circuit of tube 24, thereby raising the potential on the grid 44 of cathode ray tube 37 and causing the tube to operate and permitting the electron beam to pass, so that a spot appears on the screen 52 corresponding in position to the object being viewed, bearing in mind that the imaginary cathode ray beam moves synchronously with the rotating lobes of reception.

Thus, if the indicator apparatus of this invention is mounted on an airplane, it will scan through a forward hemisphere whose axis coincides with the line of flight and the screen 52 will give diagrammatically and in miniature the bearings of the approaching aircraft in azimuth and elevation. It will be noted that when tube 24 passes current, the left hand end of resistor 42 connected by leads 46 and 43 to the control grid of tube 37 becomes positive with respect to its right hand end, which is connected to negative lead 41, so that the control grid potential is raised, starting the cathode ray beam of tube 37, which beam is properly deflected by the potentials on deflecting plates 36 and 38 to provide a spot 54 at the proper location on screen 52. It will be borne in mind that the high parts of cams 47 and 48 are in contact with the contact members 49 and 50 during the movement of the receiving lobes through the rear halves of their revolutions, whereby these contact members serve to short-circuit the resistor 42 and prevent the tube 37 from operating while the antenna lobes are scanning the rear half of their circular arcs.

It will be noted that any number of objects within the 180° angle scanned by the antennae will be indicated in their proper positions by spots on screen 52. Displacement of a spot on the screen to the left or right, up or down, gives diagrammatically and in miniature the consecutive positions of the object, such as an aircraft, viewed relative to the nose of the observing aircraft.

When the device is used on an aircraft for preventing collision with other aircraft, a circle 55 is preferably provided on the center of screen 52 to indicate that if a spot of light is within this circle, danger of collision is imminent. Horizontal and vertical guide lines 56 and 57 are also preferably provided on screen 52 to provide reference lines and to divide the screen into quadrants. Collision is to be expected when the spot of light remains within the circle, gets larger and hence more pronounced, or when the spot 54 remains still in any position on the screen while getting larger and hence more pronounced. So long as the receiving lobe of antenna 1 rotates at 750 R. P. M. or higher, persistence of vision will prevent flicker on the screen 52, or by using suitable fluorescent material for screen 52 having a time delay in the decay of its luminosity, lower rates of rotation are feasible without flicker.

When using the device of the present invention for gun fire control, as when locating aircraft from the ground, a suitable ultra-high-frequency transmitter is provided on the ground, as disclosed in my above-mentioned patent and as shown at 60 in Fig. 1, this transmitter being suitably shielded to prevent direct radiation reaching the antenna arrays 1 and 2, and the reflected rays from the viewed object are employed for operating the indicator of this invention.

It is to be understood that the expression "electromagnetic" as used in this specification includes both the electrostatic and electromagnetic components of radiated radio waves.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a tridimensional radio direction indicator, relatively stationary antenna means, cooperating electronic means for causing said antenna means to directionally scan a field of view simultaneously in both azimuth and elevation through the establishing of rotating lobes of maximum electromagnetic signal reception, detector and amplifier means fed from said electronic means, a trigger circuit controlled from said detector and amplifier means, and a cathode ray indicator including means for establishing an electron beam therein and means for controlling said last means in accordance with the output of said trigger circuit for indicating the tridimensional bearings of an object scanned by said antenna means.

2. In a tridimensional radio direction indicator, relatively stationary directional antenna means for scanning a field of view simultaneously in a horizontal and vertical direction, detector and amplifier means, means for supplying the output of said antenna means to said detector and amplifier means, an indicator having a screen, means for scanning said screen synchronously with the operation of said antenna means and including electric control means for rendering said indicator operative, and circuit means including a rectifier having an impedance in its output circuit, said circuit means being fed from said detector and amplifier means, said impedance being connected to supply a potential to said control means of said indicator for causing the latter to function and indicate the tridimensional bearings of objects scanned by said antenna means.

3. In a tridimensional radio direction indicator, antenna means for the continuous and simultaneous scanning of a field of view both horizontally and vertically, detector and amplifier means, means for supplying the output of said antenna means to said detector and amplifier means, a trigger circuit fed from said detector-amplifier means, and an indicator controlled from said trigger circuit for indicating the tridimensional bearings of an object scanned by said antenna means.

4. In a tridimensional radio direction finder, a horizontal scanning antenna array comprising a central vertical reflector and vertical antenna elements disposed symmetrically thereabout for scanning a field of view in azimuth, a vertical scanning antenna array comprising a central horizontal reflector and horizontal antenna elements disposed symmetrically thereabout for scanning a field of view in elevation, electronic means fed from said antenna arrays including means for amplifying the outputs of the same, generating means for varying the bias on said electronic means, whereby the latter varies the amplification of the outputs of said horizontal scanning antenna elements successively and in repeated sequence and also varies the amplification of the outputs of said vertical scanning antenna elements successively and in repeated sequence but at a much higher rate, means for detecting said amplifier outputs, a trigger circuit fed from said detecting means, and an indicator controlled from said trigger circuit and operable for indicating the bearings of objects scanned by said antenna arrays.

5. In a tridimensional radio direction finder, a horizontal scanning antenna array comprising a central vertical reflector and vertical antenna elements disposed symmetrically thereabout for scanning a field of view in azimuth, a vertical scanning antenna array comprising a central horizontal reflector and horizontal antenna elements disposed symmetrically thereabout for scanning a field of view in elevation, electronic means fed from said antenna arrays including means for amplifying the outputs of said arrays, generating means for varying the bias on said amplifying means, whereby the latter varies the amplification of the outputs of said horizontal scanning antenna elements in a predetermined manner successively and in repeated sequence and also varies the amplification of the outputs of said vertical scanning antenna elements successively and in repeated sequence but at a much higher rate, detector-amplifier means fed from said electronic means, a cathode ray tube having deflecting plates supplied from said generating means and arranged to indicate by a spot on its face the tridimensional bearing of an object scanned by said antenna arrays, and a trigger circuit interconnecting said detector-amplifier means and said cathode ray tube and including a rectifier for controlling the operation of said cathode ray tube.

6. A tridimensional radio direction finder as claimed in claim 5, wherein said rectifier is provided with an impedance in its output circuit connected in the circuit of the cathode ray tube control grid for controlling the bias thereon.

7. A tridimensional radio direction finder as defined in claim 5, wherein said rectifier is provided with an impedance in its output circuit connected in the circuit of the cathode ray tube control grid for controlling the bias thereon, and means for short-circuiting said impedance when said antenna arrays are scanning to the rear of their desired field of view.

8. In a tridimensional radio direction indicator, stationary antenna means and cooperating electronic means for causing said antenna means to continuously scan a field of view simultaneously in both azimuth and elevation, means connected to said antenna means for detecting and amplifying electromagnetic signals received thereby, a cathode ray tube means, means controlled from said detector-amplifier means for determining the periods the beam of said tube is on, and means cooperating with said electronic means for applying potentials to the plates of said tube synchronously with the scanning operation.

9. In a tridimensional radio direction finder, a horizontal receiving antenna array comprising a central vertical reflector and vertical antenna elements disposed symmetrically thereabout for continuously scanning a field of view in azimuth, a vertical receiving antenna array comprising a central horizontal reflector and horizontal antenna elements disposed symmetrically thereabout for scanning a field of view in elevation simultaneously with said azimuth scanning, electronic means fed from said antenna arrays for amplifying the outputs of the antenna elements thereof, means for varying the amplification of the said electronic means connected to the several antenna elements successively and in repeated sequence, a detector-amplifier fed from said electronic means, a cathode ray tube having a control grid circuit and indicating by a luminous spot on its face the tridimensional bearing of an object scanned by said antenna arrays, a circuit interconnecting said detector-amplifier and said cathode ray tube grid control circuit including a rectifier having an impedance in its output circuit generating an electromotive force and means for controlling the operation of said cathode ray tube by the application of said electromotive force to the control grid circuit thereof.

10. In an apparatus for locating objects, the combination comprising stationary directional receiving antenna means; electrical means for scanning the direction of receptivity of said antenna means over a desired range both in elevation and in azimuth; indicator means responsive to energy received by said antenna means and including a cathode ray tube having means for producing an electron stream, and means for deflecting said electron stream; means for energizing said deflecting means to cause motion of said electron stream in a predetermined direction in correspondence with variation in the receptivity of said antenna means in the elevation coordinate; and further including means for exciting said deflecting means to cause variation in said electron stream in a different direction in correspondence with variation in said antenna means receptivity along the azimuth coordinate.

11. Radio direction indicator apparatus comprising stationary receiving antenna means, electronic means for rendering said antenna means responsive to varying directions of reception in both azimuth and elevation, cathode ray indicator means including means for producing an electron beam and a pair of independent electron-beam-deflecting means along the path of said beam, and means controlling said beam-deflecting means for deflecting said beam in respective correspondence with said elevation and azimuth variations.

12. Radio direction indicator apparatus comprising first receiving antenna means having a direction of maximum receptivity continuously variable in azimuth, second receiving antenna means having a direction of maximum receptivity continuously variable in elevation, a cathode ray tube indicator having a pair of independent deflecting means for deflecting the electron stream thereof in two independent directions, and means controlling said deflecting means respectively in correspondence with azimuthal and elevational variation in said directions of maximum receptivity.

13. Apparatus as in claim 12 further including means for controlling the intensity of the electron stream of said cathode ray tube in response to energy received by said antenna means.

14. A tridimensional radio direction indicator comprising relatively stationary antenna means, cooperating means for causing said antenna means to directionally scan a field of view simultaneously in both azimuth and elevation through the establishing of rotating lobes of maximum electromagnetic signal reception, the scanning in elevation being at a higher rate than that in azimuth, a cathode ray indicator including means for establishing an electron beam therein, means for periodically deflecting said beam in one direction in correspondence with scanning of said antenna means in azimuth, means for periodically deflecting said beam in a perpendicular direction at a higher frequency than said first periodic deflection and in correspondence with scanning of said antenna means in elevation, and means for controlling the intensity of indication of said indicator in accordance with the output of said antenna means.

15. Object locating apparatus comprising means for radiating electromagnetic energy toward an object to be located, directional antenna means for receiving energy reflected by said object, means for scanning the direction of maximum respectivity of said antenna means over a complete sphere of orientations, indicator means responsive to energy received by said antenna means and including a cathode ray tube having means for producing an electron stream and means for deflecting said stream, means for energizing said deflecting means in correspondence with the scanning of said antenna means, means for controlling said stream in response to said received reflected energy and means for disabling said indicator during periods other than those when said direction of maximum receptivity is in a desired range.

16. Object locating apparatus comprising means for radiating electromagnetic energy toward an object to be located, directional receiving antenna means for receiving energy reflected by said object, electronic means for scanning the direction of maximum receptivity of said antenna means over a complete sphere, indicator means operated in synchronism with said scanning and controlled by said received reflected energy for indicating the orientation of said object and means for disabling said indicator means over a predetermined range of orientations of said receptivity direction.

17. Object locating apparatus comprising means for radiating electromagnetic energy toward an object to be located, receiving antenna means having periodically variable direction of maximum receptivity for receiving energy reflected by said object, indicator means operated in synchronism with variations in receptivity direction of said antenna means and controlled by said received reflected energy for indicating the orientation of said object, and means for disabling said indicator means over a predetermined range of orientations of said receptivity direction.

JOSEPH LYMAN.

REFERENCES CITED

The following references are of record in the file of this patent:

UNITED STATES PATENTS

| Number | Name | Date |
| --- | --- | --- |
| 1,844,859 | Levy | Feb. 9, 1932 |
| 2,151,549 | Becker | Mar. 21, 1939 |
| 2,174,350 | Montu | Sept. 26, 1939 |
| 2,199,819 | Galle | May 7, 1940 |
| 2,254,943 | Galle | Sept. 2, 1941 |

FOREIGN PATENTS

| Number | Country | Date |
| --- | --- | --- |
| 13,170 | Great Britain | Sept. 22, 1904 |
| 812,975 | France | Feb. 15, 1937 |

Certificate of Correction

Patent No. 2,440,777.　　　　　　　　　　　　　　　　　　　　May 4, 1948.

JOSEPH LYMAN

It is hereby certified that errors appear in the printed specification of the above numbered patent requiring correction as follows: Column 1, line 14, and lines 21 and 22, for "antenna" read *antennae*; column 2, line 55, for "output" read *outputs*; column 10, line 20, for "respectivity" read *receptivity*; and that the said Letters Patent should be read with these corrections therein that the same may conform to the record of the case in the Patent Office.

Signed and sealed this 27th day of July, A. D. 1948.

[SEAL]

THOMAS F. MURPHY,
　　　　　　　　　　　　　　　　　　　　　　　*Assistant Commissioner of Patents.*